Figure 1:
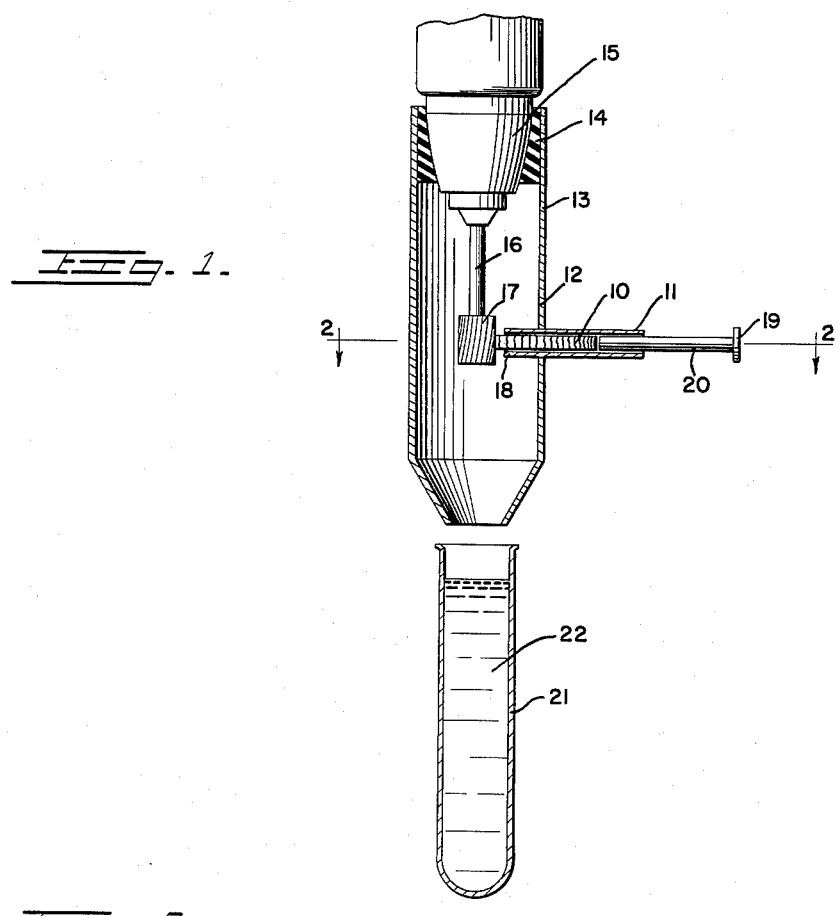

July 18, 1961

M. S. HUDSON 2,992,902

METHOD FOR DETERMINING PRESERVATIVE CONTENT OF WOOD

Filed March 21, 1956

INVENTOR
MONIE S. HUDSON

BY *[signature]*

ATTORNEY

United States Patent Office 2,992,902
Patented July 18, 1961

2,992,902
METHOD FOR DETERMINING PRESERVATIVE CONTENT OF WOOD
Monie S. Hudson, 1283 Brentwood Drive,
Spartanburg, S.C.
Filed Mar. 21, 1956, Ser. No. 572,901
5 Claims. (Cl. 23—230)

This invention relates to a method for determining the amount of perservative which is present in preservative-impregnated wood and, more particularly, to a method of determining the amount of preservative in poles which are primarily used for telephone and power lines.

Telephone companies, power companies and others, who utilize a vast number of poles as part of their extensive overall communication and electrical transportation system, conduct periodic inspections of their operating property, including such poles, for signs of improper functioning and approaching failure. With respect to poles, field engineers are always alert for signs of decay, insect damage or excessive loss of preservative which usually precedes such damage. Signs of decay may usually be noted by an overall external survey of the pole. Evidence of internal decay may be noted by tapping along the length of the pole with a hammer or probing the pole at the ground line with a sharp, pointed instrument so as to spot soft or spongy areas which are the result of fungus and bacterial attacks. By boring into a portion of the pole and examining the boring for signs of softness and crumbling, one can usually determine whether such a pole will provide several years additional service, whether it can be treated in some manner to preserve its usefullness, or whether it should be promptly replaced.

Insect damage, or damage caused by birds such as woodpeckers, is usually visible to the eye of the pole inspector and, if the damage is not too extensive, the pole may be readily treated so as to preserve its usefulness. However, the primary critical problem which confronts the field engineer is that of determining whether a particular pole, or a plurality of poles, contains enough preservative, such as creosote, to assure continued satisfactory service of the pole for an additional number of years. This problem is particularly acute in those areas where roads are being widened and power and telephone companies must re-locate their poles to new positions. Upon removing a pole from one spot where it has stood for a known number of years and, before positioning it in its new location, the field engineer inspects it for signs of decay and insect damage. However, as to whether each pole contains a sufficient amount of creosote, he must follow a rule of thumb procedure and usually attempt to estimate whether such a pole contains very little creosote, sufficient creosote so as to warrant a further creosote-impregnation treatment of the pole, or whether the pole contains sufficient preservative to assure additional years of satisfactory service without further treatment.

When a large number of poles are involved, the decision as to which poles are to be used and which to be replaced must be made as quickly and as accurately as possible. Since presently known tests of determining the creosote content of the pole require long and tedious laboratory experiments, the field engineer must rely on his rule-of-thumb test and hope that he doesn't replace too many poles which could have given adequate service for a number of years or fails to replace ones which will fail in another year or two.

The rule of thumb test which has been used in estimating the amount of creosote remaining in a pole which has been in service for a number of years has been merely to remove a boring from the pole and checking its color. If the boring is black and has a pronounced odor of creosote, the pole is considered to contain ample creosote to assure its serving for an additional number of years. If the boring is brown and has a more or less distinctive odor of creosote, the pole may be susceptible to fungus attacks in a short period of time. If the boring is very light colored and has no odor, or a musty odor, the pole is usually discarded since it does not contain a sufficient quantity of preservative. It is readily apparent that this rule of thumb test is inadequate since the color of the borings will vary depending on the moisture content of the pole. For example, a light colored boring, when wet, assumes a darker color. Further, since the ability to detect odor varies with individuals, what may appear to one person as a strong creosote odor may be a weak odor to another. Even one person's ability to detect odors may vary from day to day and, if he has a cold, such a rule of thumb test becomes extremely unreliable.

Therefore, an object of this invention is to obviate the disadvantages which presently exist in determinine the future service life of preservative-impregnated wood.

Another object of this invention is to provide a method of quickly and easily determining the amount of preservative which may be present in preservative-impregnated wood.

Still another object of this invention is to provide an improved method for ascertaining whether preservative-impregnated poles, such as telephone poles, power-line poles, flag poles and the like, contain a sufficient amount of preservative to assure additional years of useful service whether the poles should be treated further with a preservative or whether they shall be discarded.

A further object of this invention is to provide a quick and easy method for determining the amount of creosote which is present in a pole wherein such a method may be utilized by a person at the site of the pole.

In obtaining the objects of this invention, one feature resides in removing a boring from a preservative-impregnated pole, ascertaining the amount of preservative present in the boring, and then comparing the amount with a known standard. Another feature resides in grinding the boring into minute particles, placing the particles in a solvent for the preservative and measuring the color intensity of the solvent.

Still another feature of this invention resides in removing a boring of pre-determined volume from a pole, grinding the boring so as to form minute particles, placing these particles into a pre-determined volume of solvent for the preservative, and measuring the resulting color intensity of the solvent.

Figure 2:
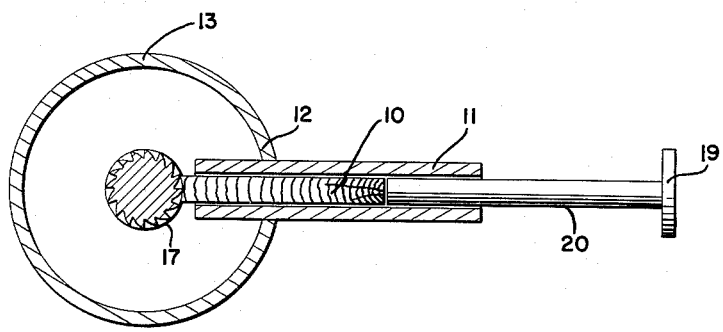

Other object features and advantages of this invention will be more apparent from the following specifications taken in conjunction with the drawing wherein;

FIG. 1 is a sectional view of an adaptor suitable for use with this invention, and FIG. 2 is a sectional view taken along the lines 2—2 of FIG. 1.

When the preservative content of wood, such as a pole used for power lines, telephone lines and the like, is to be determined, a boring is first taken from the pole by means of an increment borer. To insure accuracy of the test, the boring is preferably taken from the pole along the cross-sectional diametrical line of the pole. A pre-determined length of the boring measured from its outer-most end, is ground into minute particles and all of the particles are placed in a solvent for the preservative. This solvent becomes a distinct color which can be measured for intensity and the preservative content of the pole may be easily ascertained from this known intensity.

While different preservatives may be used to impregnate and treat poles so as to prevent fungus and bacterial attacks and assure a long future service life, the most commonly used impregnant is cresosote. However, it is to be understood that this is not in any way to be considered a limitation of the invention to this particular preservative or the solvents therefor, since the invention may also be practised with other preservatives and solvents for such preservatives.

Examples of solvents that may be used with creosote-treated poles include alcohols such as methanol, ethanol and isopropanol; esters such as ethyl acetate and amyl acetate; glycols such as ethylene glycol and propylene glycol; ketones such as diacetone alcohol; ethers and glycol ethers such as dioxane, methyl Cellosolve and dibutyl Cellosolve; nitrogen compounds such as morpholine, pyridine, quinoline, acetonitrile, etc.; and hydrocarbons such as toluene and xylene.

In order to determine whether a pole which has been removed from the location where it has stood for a number of years is fit for further service in another location, or whether a pole whose serviceability appears doubtful, contains a sufficient quantity of creosote impregnant to assure several additional years of satisfactory use, the field engineer first takes a boring from the pole with an increment borer of pre-determined cross-sectional diameter. Since fungus and bacteria are prevalent in the first eighteen inches of soil, that portion of the pole which is within this area is the critical area for testing the proper creosote content. Thus the boring should be taken at the ground line of the pole after the surface of the pole is carefully scraped to remove any adhering creosote which has bled out of the pole.

The boring is then cut to a pre-determined length from its outer surface and completely ground into minute particles. For grinding the boring, it is preferable to use an apparatus such as that illustrated in FIG. 1 of the drawing. The measured boring is placed within the tubular arm 11 which projects laterally from the cylindrical wall 12 of the adaptor 13. Located at the upper end of the adaptor 13 is a flexible sealing member 14 which frictionally engages the lower portion of a motor housing 15 so as to secure the adaptor thereto. Rotatable shaft 16 protrudes from the terminal end of the housing 15 and has a grinding head 17 attached to its outermost end. It is to be noted that the tubular arm 11 is so positioned with respect to the adaptor that its inwardly extending end portion 18 is adjacent to the grinding head 17. Thus the boring 10 within the tubular arm 11 may be moved toward engagement with the rapidly rotating grinding head 17 by applying a force to the head 19 of the plunger 20 and sliding the plunger into the tubular arm 11. The bottom portion of the adaptor is frusto-conical in shape so as to direct all the ground particles of the boring downwardly into a receptacle 21. A solvent 22 for the preservative, with which the ground particles (not shown) are impregnated is added to the receptacle up to a predetermined volume.

The receptacle 21 containing the solvent 22 is then stoppered and shaken and as the preservative is dissolved by the solvent, the solvent turns a particular shade of brown. The intensity of the color of the solvent is measured by any number of means and the amount of preservative present therein is quickly determined. The whole procedure is rapidly conducted in the field by the operator, and the process is performed at the prevailing atmospheric temperature and pressure.

Examples of means for measuring color intensity include the placing of the solvent whose color intensity is to be measured into a colorimeter having a known standard therein. From the difference in color intensities, the amount of preservative present in a cubic foot of pole is quickly determined. Also, the color of the solvent may be measured against a plurality of standard colors on a chart, each color designating a particular weight per volume of pole, so that the color on the chart closest in intensity to the color of the solvent indicates quickly and accurately to the operator the preservative content of the pole being tested.

Still another means which may be utilized includes a color standard consisting of a plurality of test tubes, each containing a similar solvent with an increased concentration of preservative therein, the concentration of the preservative in terms of weight per unit volume being known. By measuring the color intensity of the solvent being tested with the colored solvents of the standard, the amount of preservative in the pole quickly becomes known.

From tests conducted to date, it appears that when the color standards are made from poles that are within plus or minus five years of the age of those being tested, the amount of creosote indicated by the standard tubes will be within plus or minus one pound per cubic foot of the amount that would be found by the most accurate laboratory extraction procedure. This is irrespective of the characteristics of the original creosote that were used in treating the poles. The length of boring to be used in the process and the location from which the boring is taken are governed by the set of standards that is used for measuring the color intensity. For example, the outer one inch of the boring could be used and it could be taken from a point six feet above the ground line if desired, as long as the set of standards is also made from the outer one inch of the boring taken from above the ground line.

If a measure of the maximum depletion and change in composition of creosote in a pole is sought, then the boring would be taken from above the ground line because it is in this region where most of the loss of creosote occurs both by bleeding and evaporation. In this zone, reaction with oxygen of the atmosphere also causes changes in composition.

Creosote present in the section of the pole below the ground line is more nearly the composition of the original used in treatment because the surrounding soil serves as protection to prevent evaporation and oxidative changes. It has also been found that poles which have a heavy coat of pitch at the ground line, left by evaporation of creosote that has bled out and run down, yield borings in which the creosote is like that of the original because the pitch serves as a protective coat to prevent access of air and water. Poles having such coatings should be tested with a set of color standards made up of extracts from similar pitch-colored poles or from below-groundline extract of poles.

The following example is merely illustrative of one embodiment of this invention and is not to be considered as limiting in any respect thereto.

*Example 1*

A creosoted-impregnated pole to be tested was dug out at the ground line and the surface of the pole was carefully scraped to remove dirt and adhering creosote which had bled out of the pole. A boring was taken from the pole by use of an increment borer having a diameter of 3/16 of an inch. The outer one-half inch of the boring was placed within an adaptor illustrated in FIG. 1 and ground to minute particles which resembled a powder. The creosote-impregnated particles were placed within a test tube containing 10 cc. of dimethyl formamide, a solvent for the creosote. The tube was then stoppered and shaken and the creosote immediately went into the solution. The solvent turned a particular shade of brownish color whose intensity was measured with a color standard. The standard consisted of a series of five test tubes containing increasing concentrations of old creosote in dimethyl formamide equivalent to a range of 2, 4, 6, 8 and 10 pounds of creosote per cubic foot of pole. The creosote used for this purpose was obtained by extracting sections of the outer half inch of a fifteen-year-old creosoted pole with dimethyl formamide. Each of the test tubes comprising the color standard had the following amount of creosote therein per 10 cc. of dimethyl formamide:

2 pounds per cubic foot=0.0064 gram
4 pounds per cubic foot=0.0128 gram
6 pounds per cubic foot=0.0192 gram
8 pounds per cubic foot=0.0256 gram
10 pounds per cubic foot=0.0322 gram The depth of colors in the tubes ranged from a straw color to a dark brown color with increasing concentration of creosote. The unknown sample being tested was measured with the color standard and the creosote content of the pole was quickly determined.

It is known that when a pole contains two pounds or less of creosote per cubic foot in its outer one-half inch at the groundline, such a pole will not be suitable for re-use and should be discarded. These poles are subject to immediate infection since the amount of preservative is below that which tests have proven must be present in order to prevent decay.

Poles having a creosote content of between two to eight pounds per cubic foot are still re-usable provided they are given a heavy groundline treatment with creosote.

If the creosote content of the pole is between 8 and 12 pounds per cubic foot, such poles may be expected to give an additional five years' use but should be re-inspected after this period. Poles having an excess of 12 pounds of creosote per cubic foot can be expected to give at least 15 years service life before re-inspection would be necessary.

While this invention is primarily concerned with the rapid determination of the creosote content of a pole in the field, at the prevailing atmospheric temperature and pressure so that a prompt decision can be made as to whether the pole can be re-used or should be replaced, it is to be understood that the method of this invention can also be used in a creosoting plant in order to determine the amount of creosote retained by poles undergoing treatment. For example, in most creosoting plants, a plurality of poles are placed within a tank containing a definite charge of creosote. By weighing the tanks before and after the poles have been treated, the difference in weight is the amount of creosote that was retained by the poles. Thus if 100 thirty-five foot, class five poles having a volume of 1,560 cubic feet, retained 12,480 pounds of creosote, the retention in the poles is assumed to be 8 pounds per cubic foot. However, analysis of individual poles from the charge would show that the creosote retention varied from as low as 3 to as high as 15 or 16 pounds per cubic foot. The poles receiving the low amount of creosote are largely responsible for the early failures that occur in creosoted poles. Up to now, checking of creosote retention in individual poles has been an impossible task for routine plant inspection. However, with the rapid test method of this invention it is possible to quickly and easily examine each pole prior to leaving the plant and those which are found to contain below the minimum amount of creosote can be re-treated with creosote. By means of the method of this invention, considerable savings of time and money can be made by eliminating poles which are likely to fail after a few years service.

Whereas this invention has been defined with respect to the use of a creosote preservative, it is to be understood that other preservatives such as pentachlorophenol, copper naphthenate and the like are used in impregnating poles to withstand the elements and the amount of such preservatives present in a particular pole may be ascertained by the method of this invention, using an appropriate solvent or chemical compound, and measuring the amount of preservative present with a known standard. Moreover, although the description of the method has been limited to poles, its usefulness for testing other products such as lumber, cross-ties, and piling is obvious.

Having fully described the invention, what is claimed is:

1. A non-distillation process for rapidly determining at atmospheric temperatures and pressures the future service life of a preservative-containing wooden pole comprising taking a boring of predetermined volume from said pole along the cross-sectional diametrical line of the pole, grinding said boring into minute particles, placing said particles in a predetermined volume of solvent for said preservative, thoroughly mixing said particles with said solvent at atmospheric temperature and pressure until said preservative is dissolved in said solvent and measuring the color intensity of said solvent to determine the part by weight of preservative per cubic foot of pole.

2. A non-distillation process for rapidly determining at atmospheric temperatures and pressures the quantity of preservative present in a pole impregnated with said preservative comprising removing a boring of known volume from said pole grinding said boring into minute particles, placing said particles in a pre-determined volume of solvent for said preservative, thoroughly mixing said particles with said solvent at atmospheric temperature and pressure until said preservative is dissolved in said solvent, and then measuring the color intensity of said solvent.

3. A non-distillation process for rapidly determining at atmospheric temperatures and pressures the parts by weight of creosote per cubic foot of a pole impregnated with said creosote comprising removing a boring of predetermined volume from said pole grinding said boring into minute particles, placing said particles in a predetermined volume of solvent for said creosote thoroughly mixing said particles with said solvent at atmospheric temperature and pressure until said creosote is dissolved in said solvent, and measuring the intensity of the color of said solvent.

4. The process defined in claim 3 wherein the solvent is dimethyl formamide.

5. A non-distillation process for rapidly determining at atmospheric temperatures and pressures the future service life of a creosote-containing pole comprising grinding a boring of said pole of predetermined volume into minute particles, said boring taken from the pole along the cross-sectional diametrical line of the pole, placing said particles in a predetermined volume of solvent for said creosote, thoroughly mixing said particles with said solvent at atmospheric temperature and pressure until said creosote is dissolved in said solvent and measuring the color intensity of said solvent to determine the part by weight of creosote per cubic foot of pole.

References Cited in the file of this patent

UNITED STATES PATENTS

| | | |
|---|---|---|
| 571,019 | Roberts | Nov. 10, 1896 |
| 1,520,891 | Spurway | Dec. 30, 1924 |
| 1,689,901 | Williams | Oct. 30, 1928 |
| 2,484,966 | Snow | Oct. 18, 1949 |
| 2,601,953 | Savage | July 1, 1952 |

OTHER REFERENCES

Page: Anal. Chem., vol. 27, August 1955, pages 1266–1268.

Proceedings American Wood-Preservers Assoc., vol. 43, p. 73, 1947.

Mayfield: Ibid., vol. 46, pages 63, 1950.

Waterman: Anal. Chem., vol. 6, 1934, pages 409–413.

Williams: Ibid., pages 309–314.

Snell: Col. Meth. of Anal., vol. III, 1953, pages 120 and 121.

Weiss: The Preservation of Structural Timber, page 273, 1916.